Figure 1:
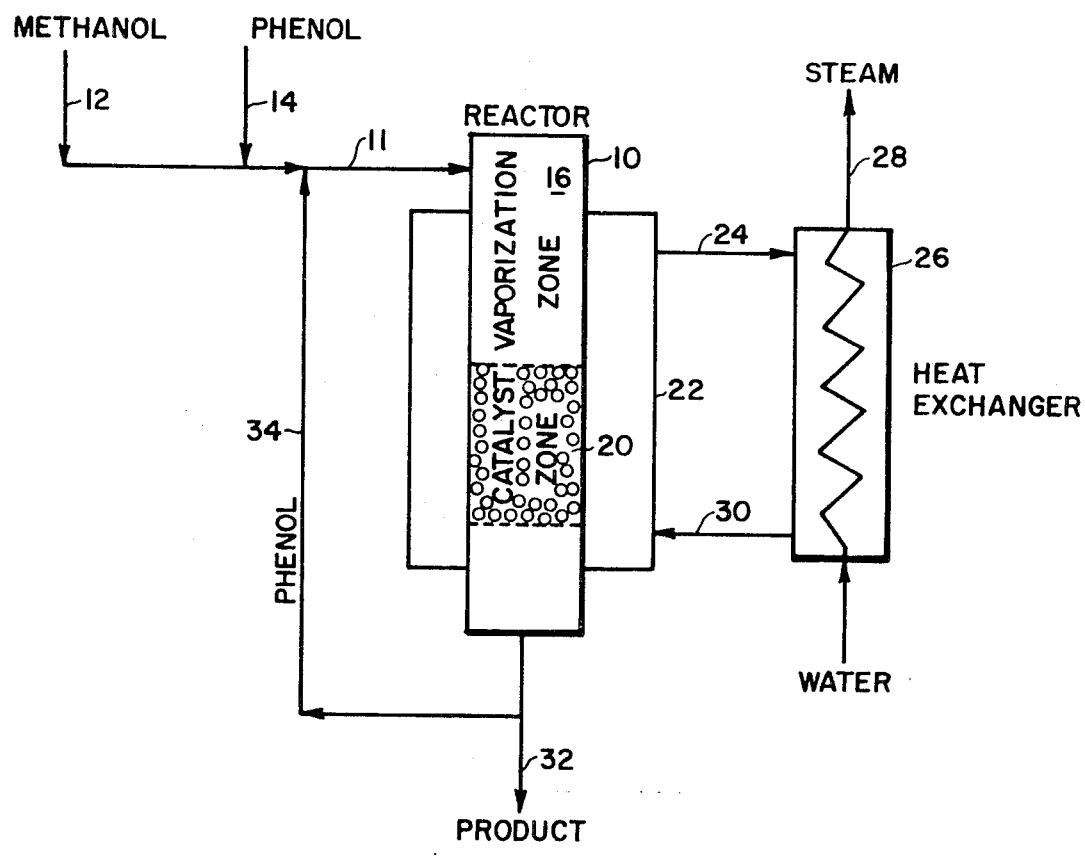

United States Patent

[11] 3,624,163

[72] Inventors Elsio Del Bel
Bethel Park;
Martin B. Neuworth, Pittsburgh, both of Pa.
[21] Appl. No. 704,839
[22] Filed Feb. 12, 1968
[45] Patented Nov. 30, 1971
[73] Assignee Consolidation Coal Company
Pittsburgh, Pa.

[54] PROCESS FOR THE PREPARATION OF META-, PARA-CRESOL MIXTURES WITH HIGH META TO PARA RATIO
9 Claims, 3 Drawing Figs.

[52] U.S. Cl. .................................................... 260/621 R, 260/624 C
[51] Int. Cl. .................................................... C07c 39/06
[50] Field of Search .......................................... 260/621, 624 C

[56] References Cited
UNITED STATES PATENTS

| | | | |
|---|---|---|---|
| 2,204,339 | 6/1940 | Bowles ........................... | 260/624 X |
| 2,542,190 | 2/1951 | Gorin et al. ..................... | 260/624 X |
| 2,448,942 | 9/1948 | Winkler et al. ................. | 260/621 |
| 2,678,951 | 5/1954 | Smith et al. .................... | 260/621 |
| 3,426,358 | 2/1969 | Schlichting ................... | 260/621 |

*Primary Examiner*—Bernard Helfin
*Assistant Examiner*—Norman P. Morgenstern
*Attorneys*—D. Leigh Fowler, Jr. and Stanley J. Price, Jr.

ABSTRACT: An improvement in the methylation of phenol or o-cresol resulting from the use of an activated alumina catalyst having strong acid sites, whereby a meta-, para-cresol distillate fraction having a high meta to para ratio can be recovered from the product by fractional distillation only.

INVENTORS
E. DEL BEL
M. B. NEUWORTH

PROCESS FOR THE PREPARATION OF META-, PARA-CRESOL MIXTURES WITH HIGH META TO PARA RATIO

This invention relates to an improved process for methylating phenol, o-cresol, or mixtures thereof to produce a mixture of cresols from which, by fractional distillation only, a distillate fraction can be recovered which contains a mixture of meta- and para-cresols having a high meta to para ratio.

Certain commercial phenolic resins are made by the condensation of formaldehyde with a mixture consisting essentially of meta- and para-cresols. In order to obtain resins of the desired properties, it is necessary that the mixture of meta- and para-cresols have a meta to para ratio greater than 1.7. The manufacturers of such resins accordingly include a recitation of such a minimum ratio in their specifications to the suppliers of the cresols. Pure meta-cresol is not specified because it would be much more expensive than the mixtures, and furthermore, the mixtures which meet the recited m,p-ratio specification produce completely satisfactory results.

Mixtures comprising principally meta- and para-cresols may be readily recovered by fractional distillation of high temperature coal tar and petroleum cresylates. These mixtures meet the required specification of a meta to para ratio greater than 1.7. However, these natural sources of meta- and para-cresols are no longer able to supply the current demand for such meta-, para-cresol mixtures. While various methods are available for making cresol mixtures containing all three isomers in varying proportions, no method has been hitherto available for making a mixture of cresols from which a mixture of meta- and para-cresols could be recovered by simple fractional distillation which had the required minimum meta to para ratio of 1.7. The mixtures which are obtained are too rich in para-cresol. Unfortunately, the para-cresol content cannot be reduced by fractional distillation since meta- and para-cresol are, for all practical purposes, inseparable by such means in view of their almost identical boiling points. Chemical methods of separation may be resorted to, but these obviously increase the cost. Accordingly, it is highly desirable to provide a method which produces a product from which a distillate fraction may be recovered that does contain meta- and para-cresol present in the desired concentration and relative proportions. That is the primary object of the present invention.

In accordance with the present invention, we have provided an improved process for making m,p-cresols having a meta to para ratio consistently larger than 1.7. The process of which the present invention is an improvement is the methylation of phenol or o-cresol with methanol in the vapor phase over an alumina catalyst. The improvement is the use of an alumina catalyst which has strong acid sites in contrast to the weak acid sites of the aluminas hitherto used in the process. The results of the improvement are unexpected and dramatic. The yield of m,p-cresols is more than doubled and, as importantly, if not more so, the ratio of meta to para cresol increases from the usual range of 1 to 1.3 to a range of 1.7 to 3. Thus a truly new source of competitively priced m,p-cresol is available.

In summary, the process of which the present invention is an improvement comprises 1. reacting methanol with phenol, or o-cresol, or mixtures thereof in the vapor phase where the molar ratio of methanol to the selected phenol is between about 0.5 and 1.5,
2. at a temperature between 350° and 450° C.,
3. at a pressure between atmospheric and 100 pounds,
4. at a liquid hourly space velocity (LHSV) between 0.3 and 1.25, and
5. in contact with an activated alumina catalyst consisting essentially of $Al_2O_3$.

The improvement is the use of an activated alumina catalyst which contains strong acid sites equivalent in strength to at least 71 percent $H_2SO_4$. Preferably, the acid sites of the catalyst are all strong acid sites, i.e. are all equivalent to at least 71 percent $H_2SO_4$. However, we have found that almost as good results are obtained if at least one-half of the acid sites are equivalent in strength to at least 71 percent $H_2SO_4$. Preferably, the number of acid sites corresponds to at least 0.1 meq./g. of catalyst, with at least one-half of them strong acid sites. It is also preferred to operate at temperatures above about 375° C.

The use of an activated alumina catalyst with strong acid sites is the key feature of the present invention. Accordingly, a brief discussion of alumina catalysts may be helpful for a better understanding and appreciation of the present invention. Alumina is a well-known and highly important industrial catalyst. In its adsorbent form, it is obtained as "activated bauxite," prepared by the direction activation of bauxite, or as "activated alumina" obtained by activating, by heat, the product of the Bayer process for the preparation of alumina. This highly sorbent type of alumina, generally referred to as activated alumina, is prepared by many methods which are well known to the art. Principally, two methods are used commercially. In one method a colloidal or subcrystalline trihydrate is precipitated from sodium aluminate by controlled acidification. It is then coagulated by drying, broken down mechanically to a suitable particle size range, and dried further at a temperature between 300° and 700° C. In the other, the crystalline trihydrate (Gibbsite) is precipitated by seeding from a sodium aluminate solution, and is then converted to an active form by calcining at elevated temperatures. Low-sodium alumina may be produced by precipitation of $Al_2O_3 \cdot 3H_2O$ with ammonium hydroxide from aluminum salts, or by hydrolysis of aluminum alkoxides, or by peptization of aluminum metal in dilute mineral acids.

Activated aluminas have been shown to have intrinsic acidity. JACS 82:2471 (1960). The extent and strength of the acid sites are a function of the method of preparation. In general, the aluminas have weak acid sites. That is, special methods of preparation or treatment are required to produce an alumina which has strong acid sites. Appropriate treatment of a low-sodium alumina with a strong acid, for example, concentrated sulfuric acid, hydrofluoric acid or phosphoric acid, results in strong acid sites. Calcination of the hydrolysis product of aluminum alkoxides at a temperature between 850° and 1,100° F. produces strong acid sites on the calcined alumina.

The use of activated alumina as a catalyst for the vapor phase methylation of phenol or o-cresol by methanol is now well established, at least in the literature. Cullinane and Chard reported in the Journal of the Chemical Society, Vol. 148, Part 2, 1945, that the main products of the reaction of methanol and phenol over activated alumina at 345° C. are (in addition to phenol itself) o-, m-, and p-cresols with some xylenols and higher methylated phenols. Of the cresols, the o-cresol was the main product with about an equal amount of p-cresol and m-cresol together, there being somewhat more p-cresol than m-cresol. The meta to para ratio was 0.83. Winkler and Mortimer, in their U.S. Pat. No. 2,448,942, patented Sept. 7, 1948, with reference to the vapor phase reaction of methanol and phenol, state "that the ortho positions are the most easily methylated, the para position becomes methylated next, and that the meta positions are the most difficult to substitute," thus confirming the findings of Cullinane and Chard. Similar results were also reported in British Pat. No. 602,257. With respect to vapor phase methylation of o-cresol by methanol over activated alumina, the principal product obtained at temperatures between 350° and 400° C. is 2,6-xylenol, according to British Pat. No. 717,588.

Our own work with activated aluminas which have not been specially prepared or treated to produce strong acid sites confirms the general observation of prior workers that the product obtained by the methylation of phenol or o-cresol contains a mixture wherein both ortho-substitution and para-substitution exceed meta-substitution. However, we have found that, if strong acid sites are present on the activated alumina catalyst, the meta-substituents exceed the para-substituents, and meta-para ratios as high as three are obtainable.

Figure 2:
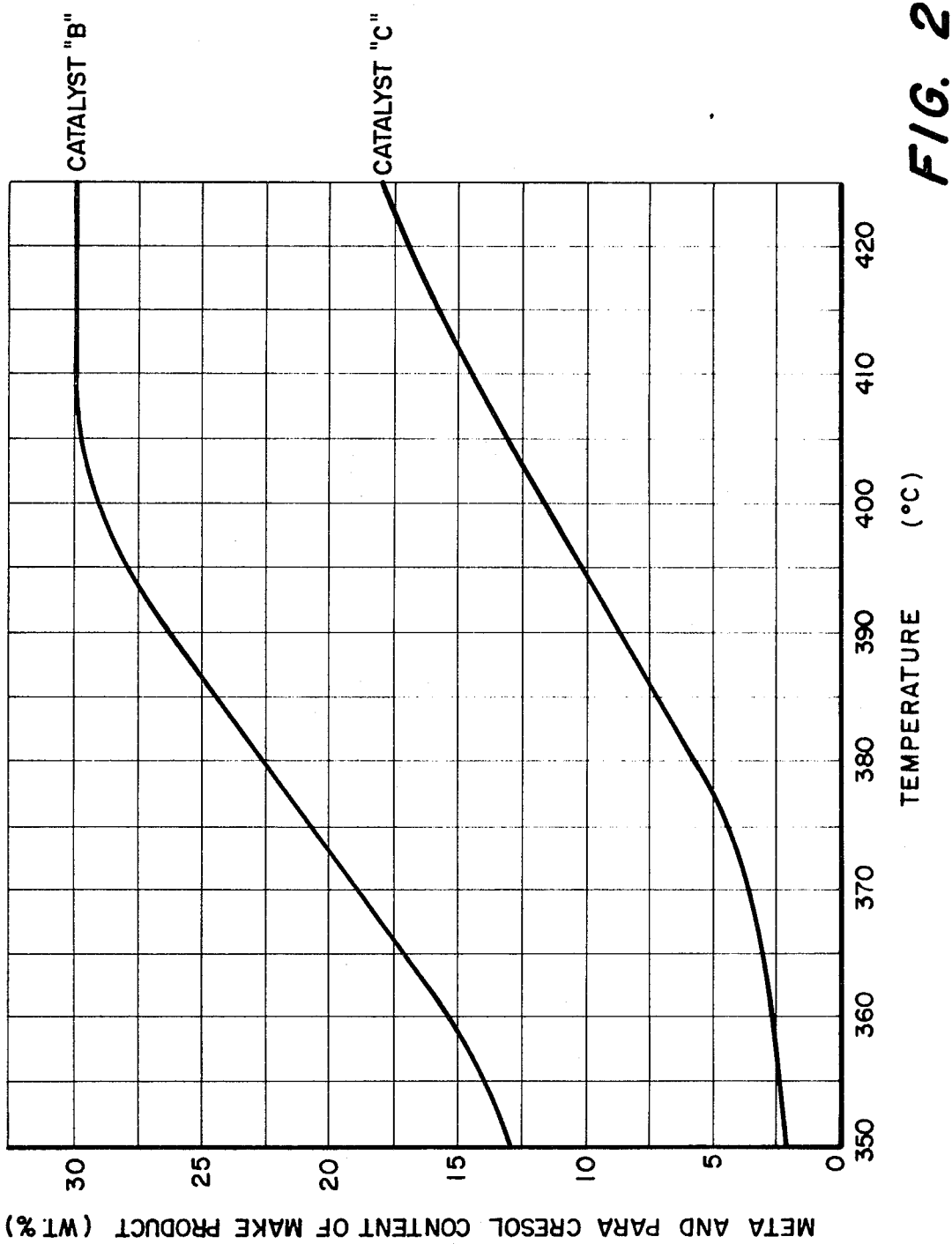
Figure 3:
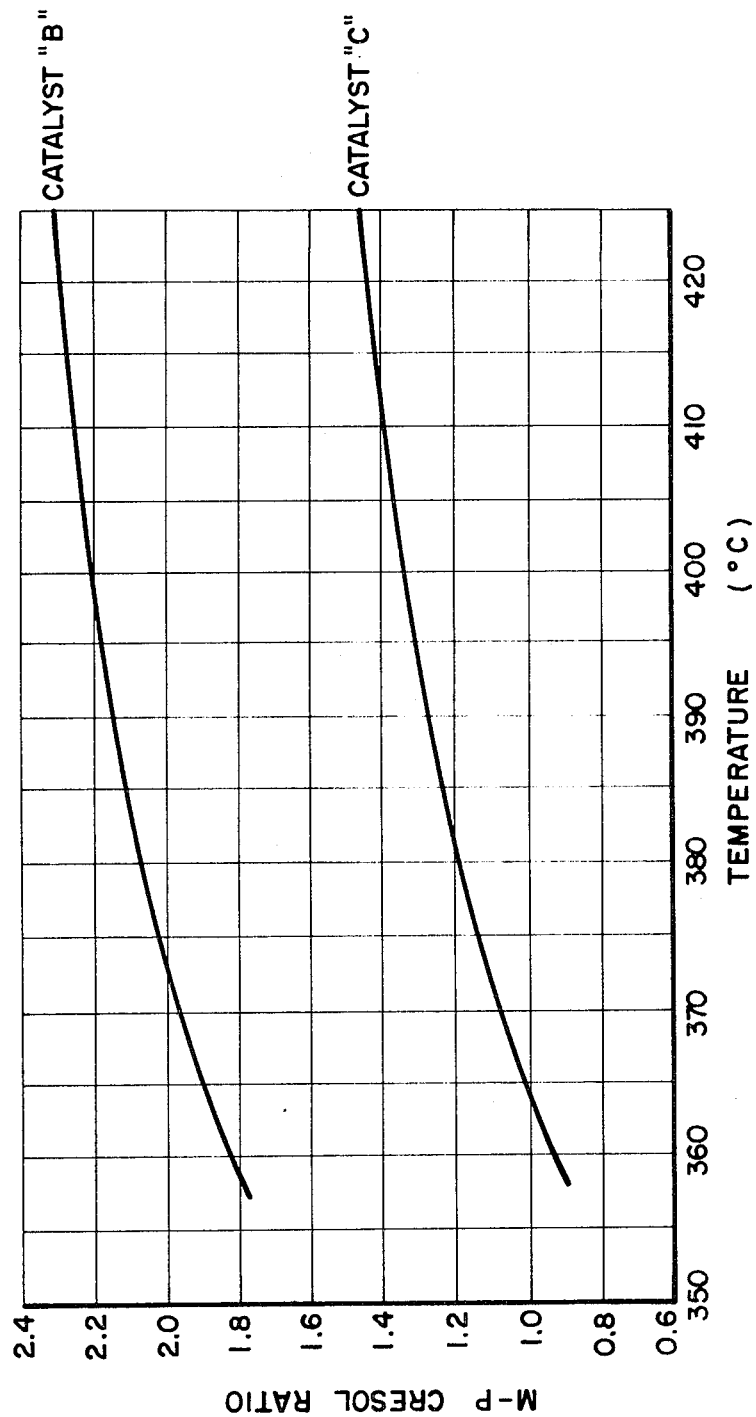

For a better understanding of our invention, reference should be had to the accompanying drawings in which FIG. 1 is a schematic flowsheet of a suitable system for conducting the process of our invention and FIGS. 2 and 3 are graphically presented results of the invention, and of prior art processes for comparative purposes, and also to the following examples which are illustrative of the preferred embodiment of our invention.

Referring to the drawing, a suitable reactor 10 for the reaction of methanol and the selected phenolic feedstock is shown. The selected phenolic feedstock is phenol or o-cresol or mixtures thereof. For convenience, the phenolic feedstock will generally be referred to simply as phenol. Methanol and phenol in liquid state are fed into a common feed conduit 11 via conduits 12 and 14 respectively, and thence into a vaporization zone 16 of the reactor 10. The mixture of the two liquids is heated in the vaporization zone 16 to convert both of them to the vaporous state. The vaporous mixture of methanol and phenol is passed over a fixed bed of catalyst in a catalyst zone 20 to effect reaction of the methanol and phenol. The temperature in the vaporization zone 16 and the catalyst zone 20 is maintained at the desired temperature by means of heat exchange with a recirculating molten salt bath contained in a vessel 22 surrounding the reactor 10. The reaction is an exothermic one so that it is necessary to remove heat in order to maintain the desired temperature. The heat-laden molten salt is transferred through a conduit 24 to a vessel 26. A steam conduit 28 is arranged in heat exchange relation with the molten salt so that water passing through it may be converted to steam for power generation or other uses. The cooled salt is returned to the vessel 22 by a conduit 30, to repeat the cycle. The products of the reaction in the catalyst zone 20 are removed therefrom through a conduit 32. A portion, if not all, of the unreacted phenol is recycled via a conduit 34, after suitable fractional distillation (not shown) of the products.

The following examples illustrate the process of the invention. First, however, the procedure employed in the runs reported in the examples will be described. The methylation was carried out in a stainless steel tubular reactor 1 to 1½ inches in diameter and 2 feet in length. The upper two-thirds of the reactor was packed with a stainless steel wire mesh and served as a preheater for the prior-blended feedstock of methanol and phenol or o-cresol, as the case may be. The lower third section of the reactor contained the catalyst fixed bed. At the start of a run, the circulating salt (a mixture of alkali nitrates with a working range of 450° to 1,200° F.) and the catalyst were heated to a temperature about 20° C. below the desired reaction temperature. At this point, the salt, the preheat zone, and the catalyst bed were at the same temperature. That is, there was no detectable thermal gradient in the reactor. Water was removed from the catalyst during the warm-up operation and during the after-purging of the catalyst bed with nitrogen. Following the nitrogen purge, the feed in the liquid phase was introduced into the reactor by a syringe-type feeder. The flow rate was metered and maintained at the desired level. The liquid mixture was completely vaporized in the preheating zone, and the vapors circulated at substantially atmospheric pressure through the catalyst bed. The alumina catalyst in the bed consisted of 10×28 mesh pellets. The effluent product was collected in a recovery system which consisted of a receiver and a trap (cooled to dry ice temperature) in series with a wet test meter.

The composition of the recovered product was determined as follows. The liquid product was weighed and then dried by azeotropic distillation with benzene. The water removed in the azeotropic distillation contained the unreacted methanol. The methanol content of this water was then determined by measuring the specific gravity of the mixture at 15.6° C.

The gross isomer distribution of the dried product was determined in a vapor-phase chromatography column, with the pelargonic triester of trimethylolpropane as stationary phase. The ratio of meta- to para-cresol was determined by converting to silyl ether derivatives, and measuring the latter by vapor phase chromatography. The gas make was determined by direct measurement on a wet test meter and generally amounted to only a fraction of one percent of the feed.

In the runs reported below, three different activated alumina catalysts were used. Catalysts A and B are examples of activated aluminas with strong acid sites, while catalyst C is a typical example of an activated alumina with no strong acid sites. Catalyst A is a sulfuric acid-treated alumina. Catalyst B is the hydrolysis product of an aluminum alkoxide, i.e. the aluminum salt of a mixture of aliphatic alcohols consisting essentially of $C_4$ to $C_{30}$ alcohols. The hydrolysis product was calcined at a temperature between 850° and 1,100° F. Catalyst C is an activated alumina which had no special treatment to produce strong acid sites. The composition of catalysts A, B, and C are tabulated below in table I.

TABLE I.—CATALYST COMPOSITION

| | Catalyst A | Catalyst B | Catalyst C |
|---|---|---|---|
| Composition: | | | |
| $Al_2O_3$ | 95.65 | 99.9+ | 97.5 |
| $SiO_2$ | 0.013 | [1] <100 | <0.10 |
| $Fe_2O_3$ | 0.095 | [1] ~40 | 0.05 |
| $Na_2O$ | 0.027 | [1] ~5 | 0.04 |
| $CaO$ | 0.470 | [1] ~37 | 0.9 |
| $MgO$ | .270 | | |
| Cl | | | <0.05 |
| $SO_4$ | 3.470 | | <0.10 |
| C | | | 1.3 |

[1] P.p.m.

The acidity of the alumina catalysts used in the runs reported below was measured. Not only was the total acidity measured, but also the relative strength of weak and strong acid sites on the catalysts was determined. The method used is briefly as follows. The dried catalyst was slurried with known concentrations of n-butylamine in dry benzene in a completely closed system. Aliquots of these slurries were withdrawn and titrated with different indicators to measure the acid strength at different values of pKa. The indicators, their color changes, pKa values and percent $H_2SO_4$ equivalents are tabulated in table II below:

TABLE II.—INDICATORS

| Indicator | Basic color | Acid color | Amount used in titration drops | pKa | Percent $H_2SO_4$ equivalent |
|---|---|---|---|---|---|
| Phenylazonaphthylamine | Yellow | Red | 1 | +4.0 | 5×10⁻⁵ |
| p-dimethylaminoazobenzene | do | Red | 1 | +3.3 | 3×10⁻⁴ |
| 4-phenylazodiphenylamine | do | Purple | 1 | +1.5 | 0.02 |
| Benazlacetophenone | Colorless | Yellow | 4 | −5.6 | 71.0 |
| Anthraquinone | do | do | 4 | −8.2 | 91.0 |

The actual procedure was as follows. The catalyst was crushed to −325 mesh. One gram of catalyst was weighed into each of separately numbered 1-oz. bottles which were then placed in a muffle furnace. The number of bottles used depended upon the precision desired. The heat was slowly raised to 575° C. for at least 8 hours. The samples were allowed to cool. Dry benzene was continuously dropped into the bottles as the samples were cooling, allowing it to evaporate. In this way, air and moisture were excluded. When the bottles were cool to the touch, approximately 15 ml. of dry benzene was added to each and the bottles sealed with a serum cap. A solution of 0.1N n-butylamine was added with a syringe to each of the bottles in amounts of 0.0, 1.0, 2.0 etc. ml. respectively (0.0, 0.5, 1.0, 1.5 etc. ml. may be used if the acidity is known to be less than 0.5 meq./gram). The bottles were agitated vigorously and allowed to set at least 4 hours. Using a syringe, 2.0 ml. of slurry was withdrawn from each bottle and placed in a suitable vial. The indicator of interest was added to each vial and the vials capped and agitated vigorously. The catalyst was observed for color change to determine how many ml. of n-butylamine were used to neutralize the catalyst acidity. The same procedure was used for each indicator of interest.

The following table III tabulates the results obtained from the determinations of acidity of catalysts A, B, and C.

TABLE III.—ACIDITY OF CATALYSTS

| Indicator | Percent $H_2SO_4$ equivalent | Meq. acid/gm. of catalyst— | | |
|---|---|---|---|---|
| | | A | B | C |
| Phenylazonaphthylamine | $5\times10^{-5}$ | .25 | 0.10 | 0.10 |
| p-Dimethylaminoazobenzene | $3\times10^{-4}$ | | 0.18 | 0.20 |
| 4-Phenylazodiphenylamine | 0.02 | .20 | 0.10 | 0.10 |
| Benzalacetophenone | 71.0 | .25 | 0.10 | 0.00 |
| Anthraquinone | 91.0 | .25 | 0.10 | 0.00 |

Thus, catalyst A contained about 0.25 milliequivalents of acidity per gram of catalyst, and all of these sites were strong acids with an acid strength corresponding to 91 percent $H_2SO_4$ or stronger. Catalysts B and C had approximately the same total acid strength, but catalyst B had more than one-half of its acid strength as strong acid, i.e. about 70–90 percent $H_2SO_4$ while all of the acid strength of catalyst C was very weak, i.e. less than 0.02 percent $H_2SO_4$.

Table IV tabulates the results obtained by methylating phenol, o-cresol and a mixture of phenol and o-cresol contact with catalysts A, B, and C.

Not only was the yield of m,p-cresols, but also the m/p ratio was greatly improved by the use of catalysts A and B, that is, the catalysts with strong acid sites. The runs tabulated in table IV above demonstrate such improvement at 400° C. FIGS. 2 and 3 of the drawings demonstrate the improvement graphically over the temperature range of about 350° to 425° C.

The following table V tabulates the results obtained from the vapor phase reaction of methanol and phenol at 375° C. over activated alumina which was treated with hydrofluoric acid to create strong acid sites corresponding to those present in catalyst A, the sulfuric acid-treated alumina. A 300-gram sample of a low-soda alumina having the composition set forth for catalyst C in table I was treated with aqueous HF in a polyethylene dish. Dilute HF, 365 grams of 3% HF, was sprayed over the alumina from a polyethylene wash bottle. A second batch, 365 grams of 3% HF, was added to the slurry and allowed to stand for about an hour. The pH of the slurry after standing was about 3.5. The slurry was transferred to a polyethylene Buchner (no paper), washed thoroughly with distilled water, and dried at 100° C. The dried catalyst was then placed in a muffle at 500° C. for about 4 hours. The results obtained in a run using this HF-treated alumina are set forth below in table V. Samples of product were taken at the end of each 5-hour period and analyzed. The analysis results for each period are reported, as well as the average for the 15-hour period. These results may be compared with the m,p-cresol content and m/p ratio at 375° C. for catalyst C, the untreated alumina shown in FIGS. 2 and 3.

The HF-treated catalyst gradually loses its effectiveness, presumably due to deposition of carbon upon its strong acid sites, thus dramatically demonstrating the importance of these sites in promoting high yields of m,p-cresol and high meta to para ratio. The effectiveness may be restored by burning off the carbon deposit.

According to the provisions of the patent statutes, we have explained the principle, preferred construction, and mode of operation of our invention and have illustrated and described what we now consider to represent its best embodiment. How-

TABLE IV.—METHYLATION RUNS

| | Run No. | | | | |
|---|---|---|---|---|---|
| | 1231-20 | 1244-44 | 1244-68 | 1258-58 | 1244-96 |
| | Catalyst | | | | |
| | A | B | B | B | C |
| | Feed | | | | |
| | MeOH: phenol (1.0 MR) | MeOH: phenol (1.0 MR) | MeOH: o-cresol (0.5 MR) | MeOH: (50 wt. percent phenol and 50 wt. percent o-cresol) (0.5 MR) | MeOH: phenol (1.0 MR) |
| Temperature (° C.) | 400 | 400 | 400 | 400 | 400 |
| LHSV | 0.5 | 0.5 | 0.5 | 0.5 | 0.5 |
| Time (hrs.) | 15 | 15 | 12 | 15 | 15 |
| Feed (wt. percent): | | | | | |
| Methanol | 25.4 | 25.4 | 12.9 | 13.8 | 25.4 |
| Phenol | 74.6 | 74.6 | | 43.1 | 74.6 |
| o-Cresol | | | 87.1 | 43.1 | |
| Products (wt. percent): | | | | | |
| −250 cresylic acids (−250 CA) | 76.5 | 78.0 | 81.6 | 85.0 | 81.5 |
| +250 cresylic acids | 3.8 | 3.7 | 6.3 | 3.5 | 2.0 |
| Water | 15.5 | 15.1 | 9.2 | 8.7 | 14.5 |
| Methanol | 0.0 | 0.0 | 0.0 | 0.0 | 0.0 |
| Dimethylether | 0.0 | 0.0 | 0.1 | 0.0 | 0.0 |
| Gas | 0.7 | 0.5 | 0.5 | 0.3 | 0.3 |
| Coke | 3.5 | 2.7 | 2.3 | 2.5 | 1.7 |
| −250 CA product composition (wt. percent): | | | | | |
| Unidentified | 0.1 | 0.2 | 0.2 | 0.3 | 0.1 |
| Phenol | 33.9 | 32.8 | 11.9 | 31.4 | 33.5 |
| o-Cresol | 26.0 | 25.4 | 18.7 | 26.2 | 32.7 |
| 2,6-xylenol | 5.1 | 4.8 | 6.7 | 4.5 | 9.7 |
| m,p-Cresols | 16.9 | 17.3 | 20.6 | 19.7 | 7.8 |
| 2,4-, 2,5-xylenols | 9.6 | 10.1 | 18.5 | 10.2 | 7.8 |
| 2,4,6-trimethylphenol | 0.6 | 0.6 | 2.3 | 0.5 | 0.9 |
| 2,3-, 2,3,6- | 5.0 | 5.3 | 11.5 | 4.7 | 3.9 |
| 3,4-xylenol | 1.4 | 1.7 | 3.4 | 1.3 | 0.9 |
| $C_9$s | 1.4 | 1.8 | 6.2 | 1.2 | 2.6 |
| M:p ratio | 2.35 | 2.17 | 2.96 | 2.53 | 1.29 |
| Phenol conversion (wt. percent) | | 65.8 | | | 63.5 |
| Phenol plus o-cresol conversion (wt. percent) | | | | 43.7 | |
| o-Cresol conversion (wt. percent) | | | 82.4 | | |

TABLE V.—HF-TREATED ALUMINA

| Run No. | 1,231-66 | | |
|---|---|---|---|
| Catalyst | ¹C | | |
| MeOH:phenol (moles) | 1.0 | | |
| Temperature (° C.) | 375 | | |
| LHSV | 0.5 | | |
| Feed (wt. percent): | | | |
| Methanol | 25.4 | | |
| Phenol | 74.6 | | |
| Time (hrs.) | 5 | 10 | Average |
| Products (wt. percent): | | | |
| −250 cresylic acids | 79.0 | 81.0 | 80.0 |
| +250 cresylic acids | 3.4 | 2.3 | 2.8 |
| Water | 14.9 | 14.6 | 14.8 |
| Methanol | 0.0 | 0.0 | 0.0 |
| Dimethylether | 0.0 | 0.0 | 0.0 |
| Gas | 0.3 | 0.3 | 0.3 |
| Coke | 2.4 | 1.8 | 2.1 |
| −250 CA composition (wt. percent): | | | |
| Unidentified | 0.2 | 0.1 | 0.2 |
| Anisoles | 0.0 | 0.0 | 0.0 |
| Phenol | 32.9 | 34.0 | 33.4 |
| o-Cresol | 25.0 | 27.4 | 26.2 |
| 2,6-xylenol | 4.1 | 5.8 | 5.0 |
| m,p-cresols | 17.2 | 12.1 | 14.6 |
| Unidentified | Tr. | 0.1 | 0.1 |
| 2,4-, 2,5-xylenols | 10.8 | 10.6 | 10.7 |
| 2,4,6-tri | 0.6 | 1.1 | 0.8 |
| 2,3-, +2,3,6- | 5.2 | 5.1 | 5.1 |
| 3,4-xylenol | 1.7 | 1.3 | 1.5 |
| C₁₉ | 2.3 | 2.4 | 2.4 |
| Phenol Conversion (wt. percent) | 65.2 | 63.0 | 64.2 |
| M:p ratio | 1.84 | 1.57 | 1.73 |

¹ Plus HF.

ever, we desire to have it understood that, within the scope of the appended claims, the invention may be practiced otherwise than as specifically illustrated and described.

We claim:

1. In the process of reacting methanol with phenol or ortho-cresol, or mixtures thereof, at a temperature between 350° and 450° C. over an activated alumina catalyst, the improvement which comprises using a catalyst which consists essentially of $Al_2O_3$ containing strong acid sites equivalent in acid strength to at least 71 percent sulfuric acid, said catalyst being produced by the treatment of $Al_2O_3$ with a strong acid selected from the class consisting of sulfuric acid, phosphoric acid and hydrofluoric acid or by the calcination of the hydrolysis product of aluminum alkoxides at a temperature between 850° and 1,100° F., whereby a methylation product is obtained from which a m,p-cresol fraction having a high meta/para ratio can be recovered by fractional distillation alone.

2. In the process of reacting methanol with phenol or ortho-cresol, or mixtures thereof, at a temperature between 350° and 450° C. over an activated alumina catalyst, the improvement which comprises using a catalyst which consists essentially of $Al_2O_3$ containing strong acid sites equivalent in acid strength to at least 71 percent sulfuric acid, said catalyst being produced by the treatment of $Al_2O_3$ with a strong acid selected from the class consisting of sulfuric acid, phosphoric acid and hydrofluoric acid, whereby a methylation product is obtained from which a m,p-cresol fraction having a high meta/para ratio can be recovered by fractional distillation alone.

3. The process of claim 2 wherein the reaction is conducted at a temperature above 375° C. and wherein the catalyst contains a number of acid sites corresponding to at least 0.1 meq./g. of catalyst, at least one-half of which are strong acid sites equivalent to at least 71 percent sulfuric acid.

4. The process of claim 3 wherein the reaction is between methanol and phenol.

5. The process of claim 3 wherein the reaction is between methanol and ortho-cresol.

6. In the process of reacting methanol with phenol or ortho-cresol, or mixtures thereof, at a temperature between 350° and 450° C. over an activated alumina catalyst, the improvement which comprises using a catalyst which consists essentially of $Al_2O_3$ containing strong acid sites equivalent in acid strength to at least 71 percent sulfuric acid, said catalyst being produced by the calcination of the hydrolysis product of aluminum alkoxides at a temperature between 850° and 1,100° F., whereby a methylation product is obtained from which a m,p-cresol fraction having a high meta/para ratio can be recovered by fractional distillation alone.

7. The process of claim 6 wherein the reaction is conducted at a temperature above 375° C. and wherein the catalyst contains a number of acid sites corresponding to at least 0.1 meq./g. of catalyst, at least one-half of which are strong acid sites equivalent to at least 71 percent sulfuric acid.

8. The process of claim 7 wherein the reaction is between methanol and phenol.

9. The process of claim 7 wherein the reaction is between methanol and ortho-cresol.

* * * * *